United States Patent [19]

Tsuboi

[11] Patent Number: 5,735,214
[45] Date of Patent: Apr. 7, 1998

[54] STREAMLINE TRACK SYSTEM WITH CARRIERS AND RAIL

[76] Inventor: Nobuyuki Tsuboi, 23-2-706 Hayakocho, Neyagawa City, Osaka 572, Japan

[21] Appl. No.: 773,830

[22] Filed: Dec. 27, 1996

[51] Int. Cl.$^6$ ........................................ B61C 11/04
[52] U.S. Cl. ................ 105/29.1; 105/144; 104/106; 104/119; 384/13; 384/55; 384/57; 384/58
[58] Field of Search ........................ 105/29.1, 141, 105/144; 104/106, 118, 119; 384/13, 49, 50, 55, 57, 58, 59

[56] References Cited

U.S. PATENT DOCUMENTS

| | | | |
|---|---|---|---|
| 3,552,805 | 1/1971 | Dunlap | 384/58 |
| 3,756,670 | 9/1973 | Harris | 105/29.1 |
| 4,422,384 | 12/1983 | Johnson et al. | 105/29.1 |
| 5,086,705 | 2/1992 | Jarvis | 105/29.1 |
| 5,267,796 | 12/1993 | Nonaka et al. | 384/13 |

FOREIGN PATENT DOCUMENTS

| | | | |
|---|---|---|---|
| 2113114 | 4/1990 | Japan | 384/58 |
| 681412 | 10/1952 | United Kingdom | |

Primary Examiner—S. Joseph Morano
Attorney, Agent, or Firm—Oblon, Spivak, McClelland, Maier & Neustadt, P.C.

[57] ABSTRACT

A track system for roller-equipped carriers to run along a straight and/or curving guide rail, which includes two pairs of opposed parallel plain lanes, a pair of oppositely directed parallel V edges intermediate the two pairs of plain lanes, and narrow lubricating grooves along each V edge. Each carrier has a frame and roller assemblies, each having a pair of ball bearings mounted on a journal, spaced apart from each other and beveled oppositely on their adjacent outer race corners, so that the base areas of V edges engage between the beveled corners, and the top areas of V edges remain free within the space between the outer races in each pair, the outer races mostly rolling on the plain lanes. Each curving rail segment is provided with straight extensions formed on both ends to be connected to straight rail segments.

12 Claims, 10 Drawing Sheets

STREAMLINE TRACK SYSTEM WITH CARRIERS AND RAIL

BACKGROUND OF THE INVENTION

The present invention relates to a guide system, and more particularly to a track system in which roller-equipped carriers usually run along a straight and/or curving guide rail to transfer various articles in industrial and many other fields.

The most important fundamental problems for this kind of guide system have been friction and play. For instance, British Patent No. 681,412 (Forster) guides one member relatively to another member by means of oppositely directed parallel V edges on one of the members being adapted to co-operate with pairs of bearings on the other member in a way that the V edges engage fully between chamfered edges of the outer races of the two bearings in each pair.

Since one member is guided relatively to another member only by the full edge-to-edge engagement, much friction will be caused in the engaging areas of both members. And especially the V edges will tend to be wedged so tightly between the edges of the two bearings in each pair during their relative movement as to prevent the bearings from rolling normally and force them to slide on the V edges from time to time, and this will intensify friction unduly, resulting in early wear and excessive play.

Another important problem for this kind of guide system is lubrication. It may be necessary for light and noiseless running to lubricate the guide rail all along its length during operation. A considerably long rail will require a large number of separate lubricators to be designed and arranged for this purpose.

If the guide system has a considerably long streamline rail comprising both straight and curving segments, straight-to-curving rail joints cannot be made as accurate as straight-to-straight joints, and then the carriers will often tend to catch the straight-to-curving joints as they pass by, resulting in rattling, irregular running and early failure. Moreover, the carrier rollers will often be prevented from rolling normally and forced to slide on the rail, as the carriers are pushed unduly against one side of the rail due to centrifugal force when they run along curving segments. And this will intensify friction unduly, resulting in early wear and excessive play.

And it has been desired that an accurate, durable and noiseless streamline track system is easy and cost-saving to manufacture, install, operate and maintain.

BRIEF SUMMARY OF THE INVENTION

It is a main object of the invention to provide a track system which can minimize friction and keep play at a desired level over a long period of service.

Another object of the invention is to provide a track system which makes it possible for the carriers to run with their rollers not in a sliding relation but in an assuredly rolling relation to the guide rail, even when they run along curving segments of the rail.

A further object of the invention is to provide a track system in which the guide rail can be lubricated all along its length during operation without providing any particular separate lubricators.

A further object of the invention is to provide a streamline track system which has no straight-to-curving rail joint but straight-to-straight joints only, though the rail comprises both straight and curving segments.

A still further object of the invention is provide an accurate, durable and noiseless streamline track system which is easy and cost-saving in manufacture, installation, operation and maintenance.

A track system in accordance with the invention usually comprises a straight and/or curving guide rail of a desired length and a plurality of roller-equipped carriers to run along the guide rail to transfer articles attached to the carriers.

The guide rail has a substantially rectangular cross section, and is provided with a pair of opposed parallel guide sides and a pair of opposed parallel set sides. The guide sides are provided with two pairs of opposed parallel plain lanes, and a pair of oppositely directed parallel V edges intermediate the two pairs of plain lanes. The set sides are provided with bolt holes through them. The guide rail is fixed to a supporting structure with set bolts either directly or by the intermediary of base members with or without hollow rivets.

Each carrier has a substantially flat frame, and is provided with a plurality of roller assemblies rigidly supported on the frame at both guide sides of the rail. Each roller assembly is provided with a pair of radial-type ball bearings mounted on a journal which has a stem formed on one end thereof, and the journal is secured to the frame by means of the stem. In some of the roller assemblies the journal has a stem formed in an eccentric relation to it so that the pair of ball bearings on this journal may be moved toward or away from the pair of ball bearings on the opposite side of the guide rail to fine-adjust the play between them. The stem may be held firmly at the fine-adjusted position by a split and a bolt provided in the frame.

In each roller assembly the pair of ball bearings are spaced apart from each other by the intermediary of a collar, and beveled oppositely on the adjacent corners of their outer races. The guide rail V edges are adapted to co-operate with the ball bearings in each pair in a way that the base areas of V edges engage between the beveled corners of bearing outer races in each pair, and that the top areas of V edges remain free from engagement or contact within the space between the ball bearings in each pair, while the outer races except the beveled corners in each pair co-operate with the plain lanes adjacent each V edge in a normal rolling relation to them. Thus each carrier is guided along the rail not only by the partial edge-to-edge engagement of the V edges and beveled corners but also by the normal rolling contact of the plain lanes and outer races, instead of the full edge-to-edge engagement in the above-mentioned British Patent.

Narrow grooves are formed along the borderlines between each V edge and its adjacent plain lanes on the guide rail to keep lubricating oil all along the rail during operation.

In case a curving rail segment is connected with straight rail segments, it is usually provided with straight extensions formed on both ends thereof to facilitate connecting.

In case the guide rail is fixed to a supporting structure by the intermediary of base members, the joints of rail segments may be displaced from the joints of base members so as to overlap the rail joints with base members.

A gear rack may be provided along one side of the base members to co-operate with pinions to be driven by suitable driving means mounted on the carrier frames so that the carriers may run automatically along the guide rail. Some roller assemblies may also serve as pinions to co-operate with the gear rack. Alternatively, the guide rail may be moved relatively to a supporting structure, if the carriers are fixed to the supporting structure while the rail and base members are not fixed to it.

A pair of parallel guide rails each having only one guide side may be employed in a way that the V edges are in an oppositely directed parallel relation to each other with relatively wide base members being intermediate both rails so as to co-operate with relatively wide carriers.

BRIEF DESCRIPTION OF THE DRAWINGS

Having thus generally described the nature of the invention, reference will now be made to the accompanying drawings in which preferred embodiments thereof are shown by way of illustration, and in which.

DETAILED DESCRIPTION OF THE INVENTION

Referring to FIGS. 1 through 6, the track system embodying the invention primarily comprises a straight guide rail 1 and a plurality of carriers 10 to run along the guide rail 1 to transfer articles (not shown) attached to the carriers 10, which are connected to outside driving means (not shown).

Figure 1:
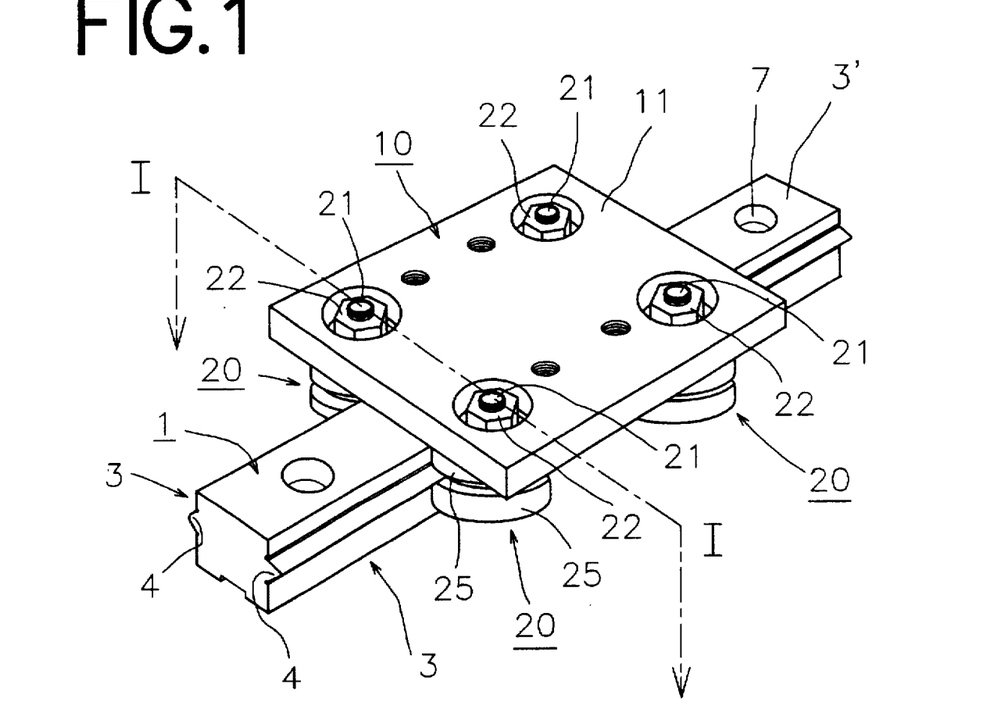
FIG. 1 is a perspective view of a carrier and a guide rail in part embodying the invention, where set bolts are removed from the guide rail.
Figure 3:
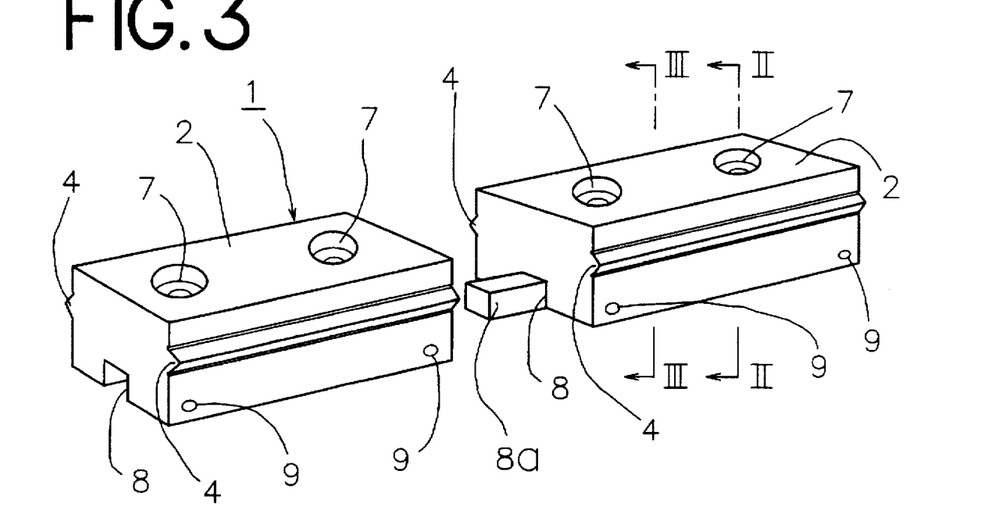
FIG. 3 is a perspective view of two adjacent guide rail segments with a joint key to compose the guide rail in FIG. 1.
Figure 4:
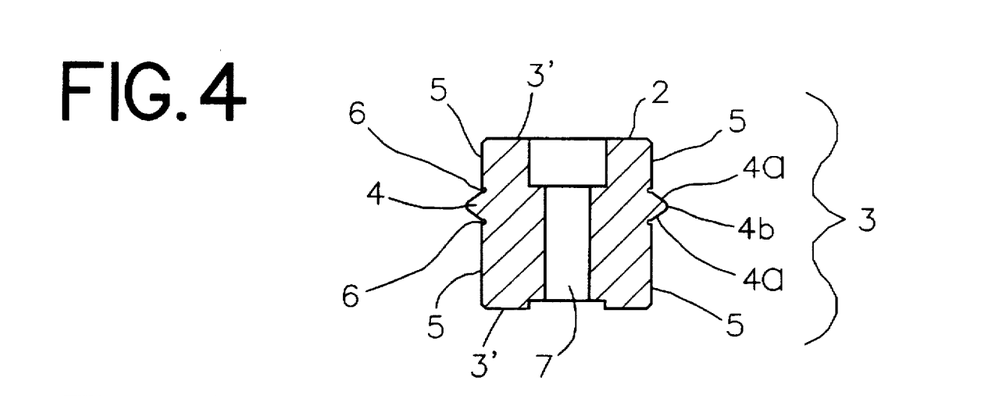
FIG. 4 is a vertical section taken approximately on the line II—II in FIG. 3.
Figure 5:
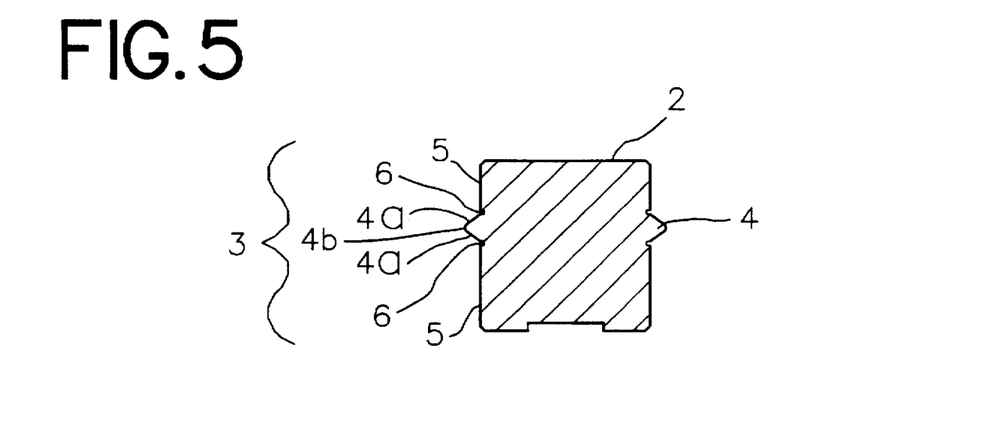
FIG. 5 is a vertical section taken approximately on the line III—III in FIG. 3.

The guide rail 1 comprises a plurality of straight rail segments 2, as shown in FIG. 3. Each rail segment 2 has a substantially rectangular cross section, and is provided with a pair of opposed parallel guide sides 3 and a pair of opposed parallel set sides 3'. The guide sides 3 are provided with two pairs of opposed parallel plain lanes 5, and a pair of oppositely directed parallel V edges 4 intermediate the two pairs of plain lanes 5. The set sides 3' are provided with bolt holes 7 through them. The rail segments 2 are connected in alignment with each other by means of keys 8a put in key grooves 8 which are provided in one of the set sides 3'. The rail segments 2 are fixed to a supporting structure 50 with bolts 7'. Narrow grooves 6 are provided along the borderlines between each V edge 4 and its adjacent plain lanes 5.

Each carrier 10 comprises a substantially flat square frame 11 and four roller assemblies 20 arranged near the four corners of the frame 11 in a rigidly supported relation to it; two of them at one of the guide sides 3 and the others at the opposite guide side. Each roller assembly is composed with a journal 24 having a hexagonal head 28 on one end thereof and a threaded stem 21 on the other end, a pair of radial-type ball bearings 25 mounted on the journal 24, a collar 23 of a given thickness intermediate the ball bearings 25, a nut 22 to engage the threaded stem 21, and a washer to co-operate with the nut 22.

In each roller assembly the journal 24 has a shoulder 29 formed intermediate the head 28 and the stem 21. The head 28 is provided with a threaded shank 28' to be screwed into one end of the journal 24. The inner races of ball bearings 25 are clamped on to the journal 24 against the shoulder 29 by screwing the shank 28' into the journal 24; on this occasion, some adhesive is applied over the shank 28' so as to keep the ball bearings firmly in the clamped position. The stem 21 enters a hole 12 in the frame 11 and is clamped there against the shoulder 29 with the nut 22 and its co-operative washer.

The stem 21 is formed on the journal 24 in a parallel relation to each other; and they are either in a concentric or eccentric relation to each other. In the roller assemblies at one of the guide sides 3 each journal 24 and its stem 21 are in an eccentric relation to each other, so that the pair of ball bearings 25 mounted on this journal may be moved toward or away from the pair of ball bearings 25 at the opposite guide side 3 by rotating the shoulder 29 to fine-adjust the play between them at a desired level. The shoulder 29 has a cross section with a pair of parallel straight sides to facilitate rotating.

Figure 6:
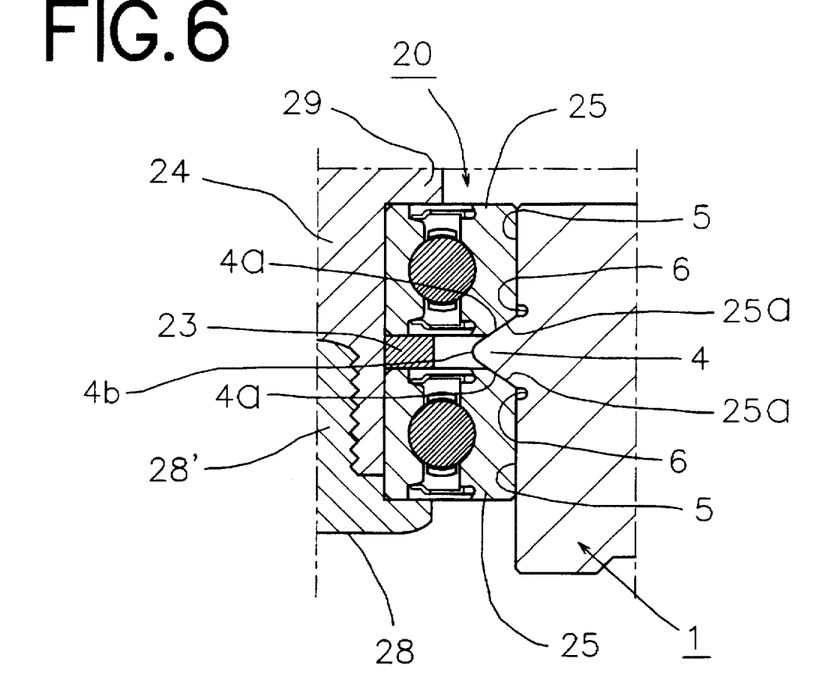
FIG. 6 is an enlarged view showing the co-operating relation of the guide rail and carrier roller assembly in FIG. 1.

In each roller assembly 20 the pair of ball bearings 25 are spaced apart from each other by the intermediary of the collar 23, and beveled oppositely on adjacent corners 25a of their outer races, as best shown in FIG. 6. Each V edge 4 is provided with a top area 4b having a cross section of a substantially acute angle, and base areas 4a adjacent to the top area 4b. The V edges 4 are adapted to co-operate with the ball bearings 25 in each pair in a way that the base areas 4a of V edges 4 engage between the beveled corners 25a in each bearing pair, and that the top areas 4b of V edges 4 remain free from any engagement or contact within the space left between the ball bearings 25 in each pair, while the outer races except the beveled corners 25a in each pair co-operate with the plain lanes 5 adjacent each V edge 4 in a normal rolling relation to them. Thus each carrier 10 is guided along the rail 1 not only by the engagement of the V edge base areas 4a and beveled corners 25a but also by the normal rolling contact of the plain lanes 5 and bearing outer races; the latter contact areas are much larger than the former engaging areas.

Each rail segment 2 is provided with small screw holes 9 in the guide sides 3. Set screws are put into them to fine-adjust the positions of key 8a so as to put the rail segments 2 in a good alignment with each other and keep the keys 8a in the fine-adjusted positions firmly.

Narrow longitidinal grooves 6 are formed along the borderlines between each V edge 4 and its adjacent plain lanes 5 to keep lubricating oil all along the guide rail 1 during operation.

Since the carriers 10 are guided along the rail 1 not only by the relatively narrow engagment of the V edge base areas 4a and beveled bearing corners 25a but also by the relatively wide rolling contact of the plain lanes 5 and bearing outer races, friction will be descreased considerably and the carriers 10 will run along the guide rail 1 without any substantial tilting and zigzaging.

Because the top areas 4b of V edges 4 remain free of any engagement or contact within the space left between the bearing outer races in each pair, it will be avoided without fail that the V edges 4 are wedged unduly between the bearing outer races in each pair to cause so much friction as to prevent the ball bearings 25 from rolling normally and force them to slide on the guide rail 1. Instead, the ball bearings 25 will run in an assuredly rolling relation to the guide rail 1. This will decrease friction drastically and permit the carriers to run quite lightly and noiselessly.

Moreover, lubricating oil can be kept sufficently in the narrow grooves 6 so that the guide rail 1 may be lubricated all along its length for a considerably long time during operation. This will not only help decrease friction and add to light and noiseless running but also help decrease maintenance. Since the narrow grooves 6 define the boundaries between the V edges 4 and plain lanes 5 sharply, the ball bearings 25 can run in a rightly fitting relation to the guide sides 3, and this will facilitate assured running all the more.

Because friction is decreased greatly as mentioned above, play can be maintained at a desired level over a substantially long period of service once it is predetermined by rotating the shoulders 29 of those journals 24 that are in an eccentric relation to their stems 21.

Any desired length of guide rail 1 can be laid in a good alignment easily on a supporting structure simply by connecting a plurality of rail segments 2 by means of joint keys 8a and their co-operative set screws.

The straight rail segments 2 can be manufactured by drawing or rolling carbon steel and other metallic materials. The guide sides 3 may be finished up, for instance, by grinding if necessary. The simple configuration of guide rail 1 with plain lanes 5 and sharply defining narrow grooves 6 will facilitate such drawing, rolling and finishing up, and thus accurate guide rail segments can be manufactured easily and cost-savingly.

Rust-preventative rail segments can be made from stainless steel. Mettalic guide rails may be coated with durable self-lubricating synthetic resin for noiseless and dustless running. The rail segments may also be made of such synthetic resin itself.

The like numbers indicate the like members hereinafter.

Figure 2:
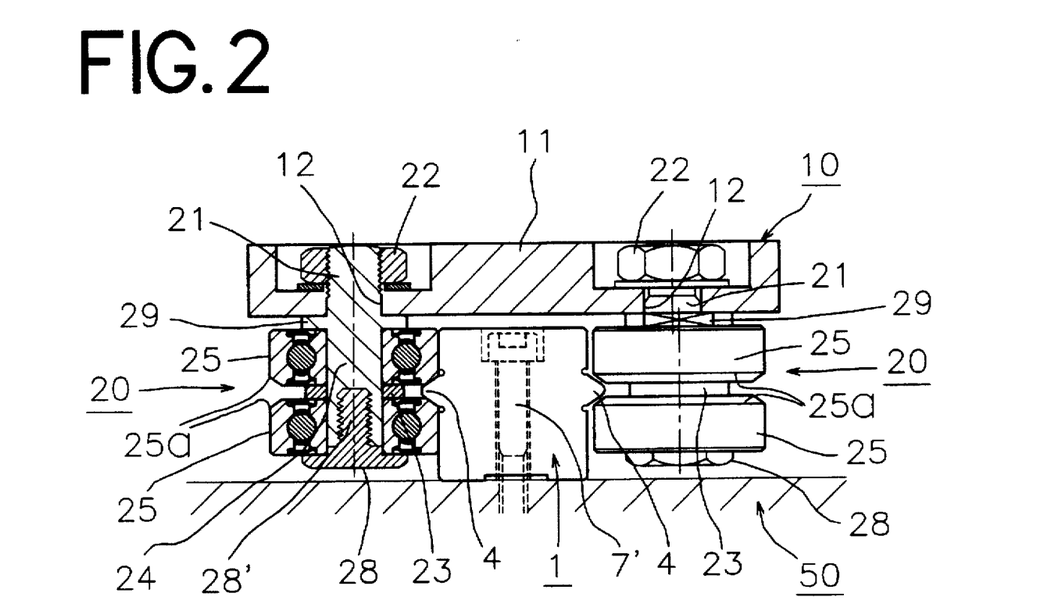
FIG. 2 is a vertical section in part taken approximately on the line I—I in FIG. 1, where the guide rail is fixed to a supporting structure with a set bolt shown in chain lines.
Figure 7:
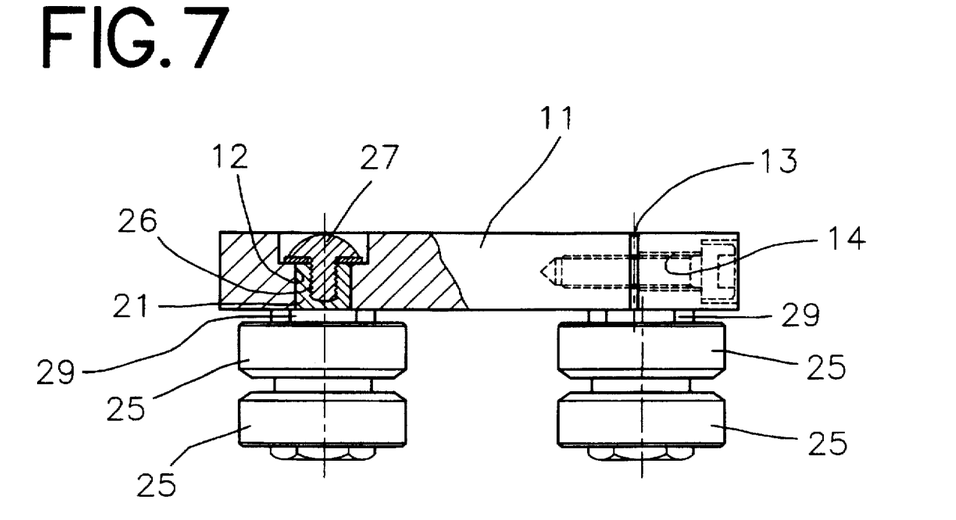
FIG. 7 shows a modification of the embodiment in FIG. 2.

The carrier in FIG. 2 may be modified as shown in FIG. 7, where each stem 21 is provided with a threaded hollow 26 at one end thereof instead of the outer peripheral thread shown in FIG. 2, and also where a slit 13 is provided through the frame 11 in connection with the hole 12 for each stem 21 that is in an eccentric relation to its journal.

In FIG. 7 each stem 21 enters its co-operative hole 12 in the frame 11 and is clamped there against the shoulder 29 with a small set screw 27 and its co-operative washer. A bolt enters a bolt hole 14 provided in the frame 11 in a normally crossing relation to each slit 13. Each slit 13 is adapted to co-operate with this bolt in a way that the slit 13 is narrowed by tightening the bolt. Once play is fine-adjusted by rotating the shoulder 29, each eccentric stem 21 is held firmly in the fine-adjusted position by tightening its cooperative bolt.

The threaded hollows 26 co-operative with the small set screws 27 will help make the carriers light and compact. Since the eccentric stems are held firmly in the fine-adjusted positions, a predetermined play can be maintained over a substantially long period of service, thus decreasing maintenance so much.

Figure 8:
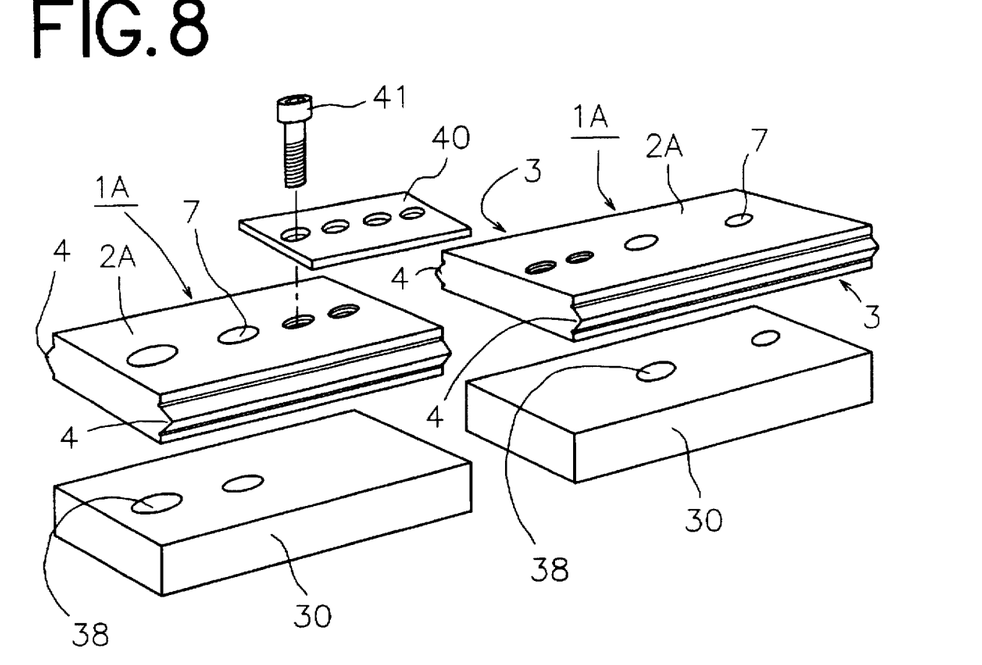
FIG. 8 is a perspective view of a pair of guide rail segments and base members with a joint plate embodying the invention.
Figure 9:
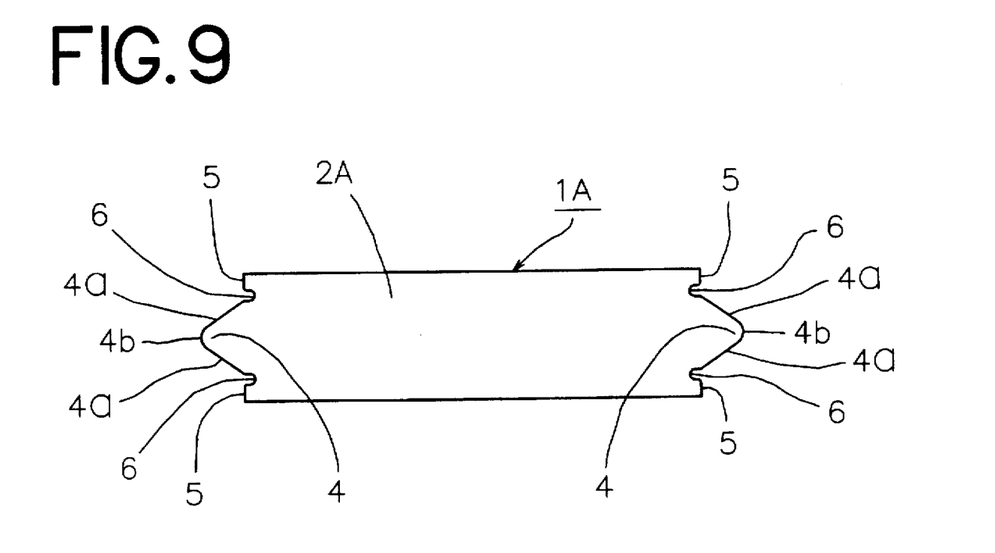
FIG. 9 is an enlarged side end view of the guide rail in FIG. 8.

The guide rail in FIGS. 8 and 9 is wholly designated as 1A, and fundamentally similar to the guide rail in FIGS. 1 through 6.

The guide rail 1A comprises a pair of relatively thin straight rail segments 2A. Each rail segment 2A is fixed to a supporting structure (not shown) with set bolts (not shown) by the intermediary of base members 30; the rail segments 2A and the base members 30 are provided with bolt holes 7 and 38, respectively, and the set bolts go through them. Both rail segments 2A are connected with each other by means of a joint plate 40 and set screws 41. The base members 30 are less wide than the rail segments 2A.

The relatively thin rail segments 2A can be manufactured similarly to, but with more ease and less cost than, the relatively thick ones in FIGS. 1 through 6. Moreover, the distance between the guide rail 2A and the supporting structure can be varied desiredly with ease by varying the thickness of base members 30.

Figure 10:
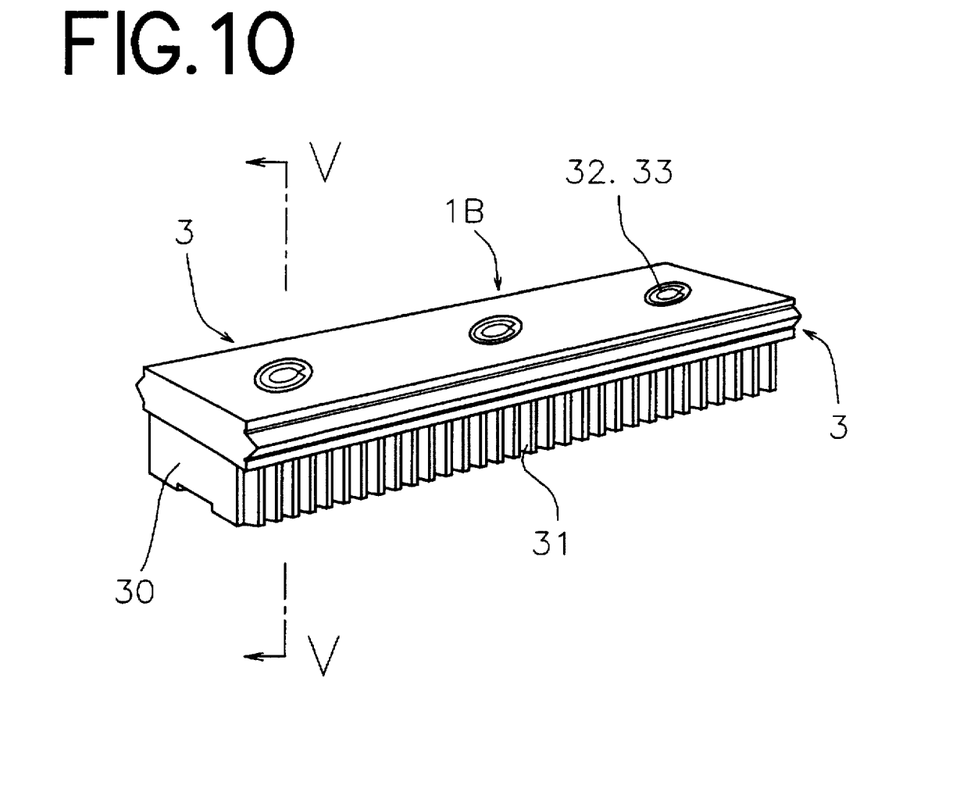
FIG. 10 is a perspective view of a guide rail and a base member with a gear rack embodying the invention.
Figure 11:
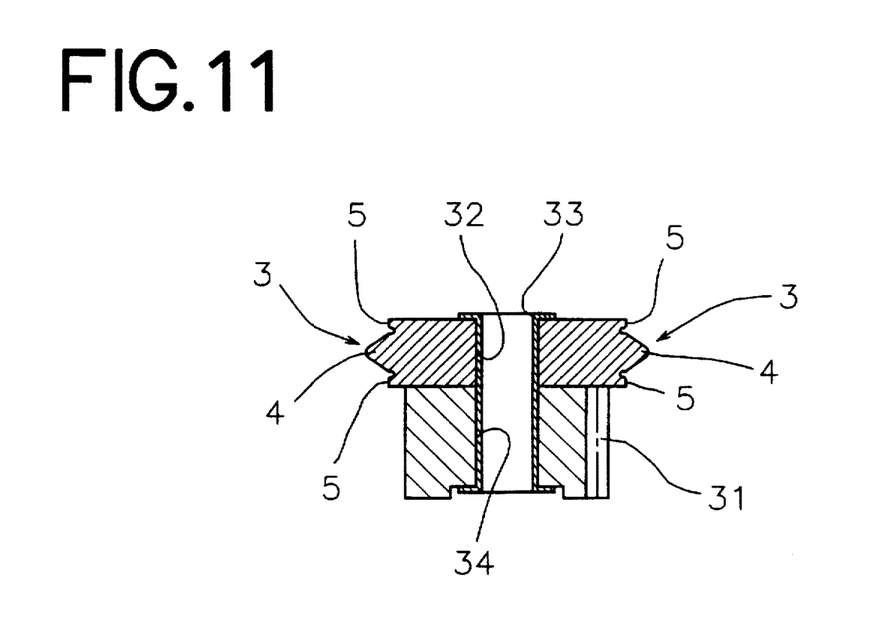
FIG. 11 is a vertical section taken approximately on the line V—V in FIG. 10.

The guide rail in FIGS. 10 and 11 is fundamentally similar to the one in FIGS. 8 and 9, and comprises a single straight rail segment 1B and a base member 30.

The rail segment 1B and the base member 30 are joined together with hollow rivets 33 through rivet holes 32 and 34 which are provided in the rail segment 1B and the base member 30, respectively. The rail segment 1B is fixed to a supporting structure (not shown) with set bolts (not shown) by the intermediary of the base member 30; the set bolts go through the hollow rivets 33.

The rail segment 1B is provided with a pair of opposed parallel guide sides 3, and a gear rack 31 is provided at one side of the base member 30 along one of the guide sides 3 in an adjacent parallel relation to it to co-operate with a pinion of driving means (not shown). The base member 30 is less wide than the rail segment 1B, so that the total width of base member 30 and gear rack 31 may be less than the distance between both guide sides 3, as best shown in FIG. 11.

Figure 12:
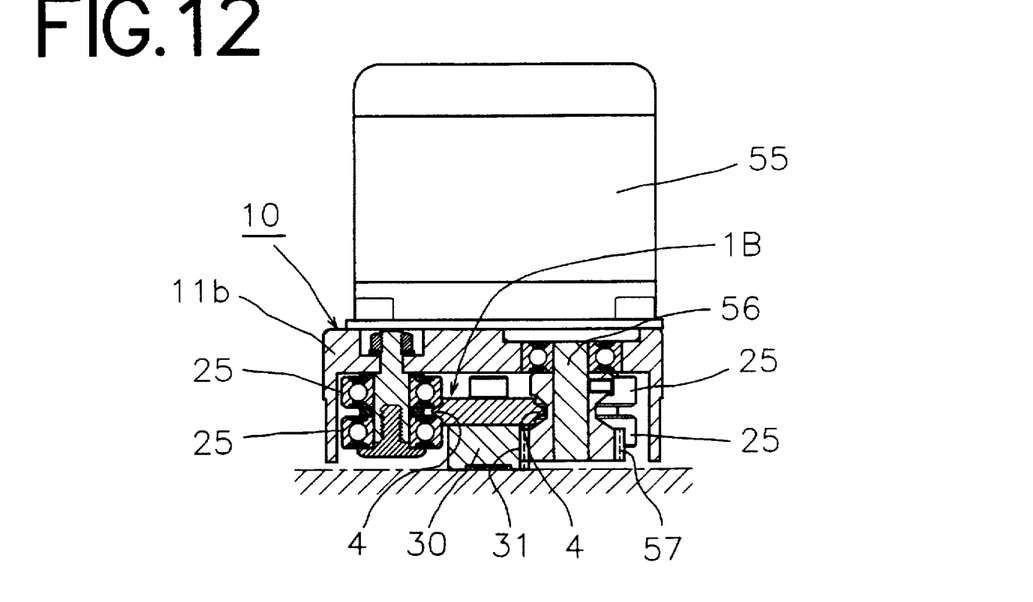
FIG. 12 is a vertical elevation in part of another embodiment.

The embodiment in FIG. 12 primarily comprises a guide rail 1B and a carrier 10 to run along the rail 1B. The guide rail 1B is similar to the one shown in FIGS. 10 and 11, and joined with a base member 30 which is provided with a gear rack 31. The carrier 10 is similar to the one shown in FIGS. 1 through 6, but it is equipped with a driving motor 55 having a drive shaft 56 and a pinion 57 at one end thereof.

The carrier 10 has a side-covered frame 11b, on which the motor 55 is mounted securely. The pinion 57 is adapted to co-operate with the gear rack 31 so that the carrier 10 may run automatically along the guide rail 1B to transfer an article attached to it.

Figure 13:
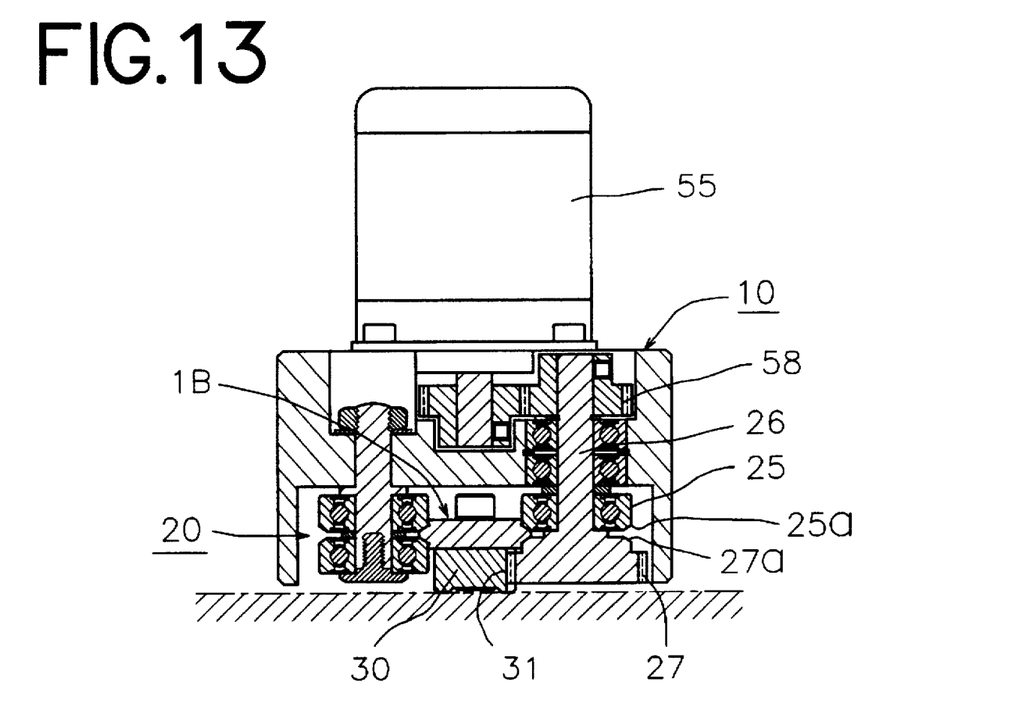
FIG. 13 shows a modification of the embodiment in FIG. 12.

The embodiment in FIG. 13 is fundamentally similar to the one in FIG. 12, but one of the roller assemblies is so modified as to have a combination of a ball bearing 25 and a pinion 27 instead of a pair of ball bearings 25.

The modified roller assembly includes a journal 26 having a pinion 27 formed on one end thereof and a gear 58 mounted on the other end. The single ball bearing 25 is mounted on the journal 26 adjacent the pinion 27. The outer race of ball bearing 25 and the pinion 27 are beveled oppositely on their adjacent corners 25a and 27a. The gear 58 engages another gear mounted on a drive shaft of a driving motor 55 with which the carrier 10 is equipped. The pinion 27 is adapted to co-operate with a gear rack 31 provided at one side of a base member 30, so that the carrier 10 may run automatically along the guide rail 1B.

Figure 14:
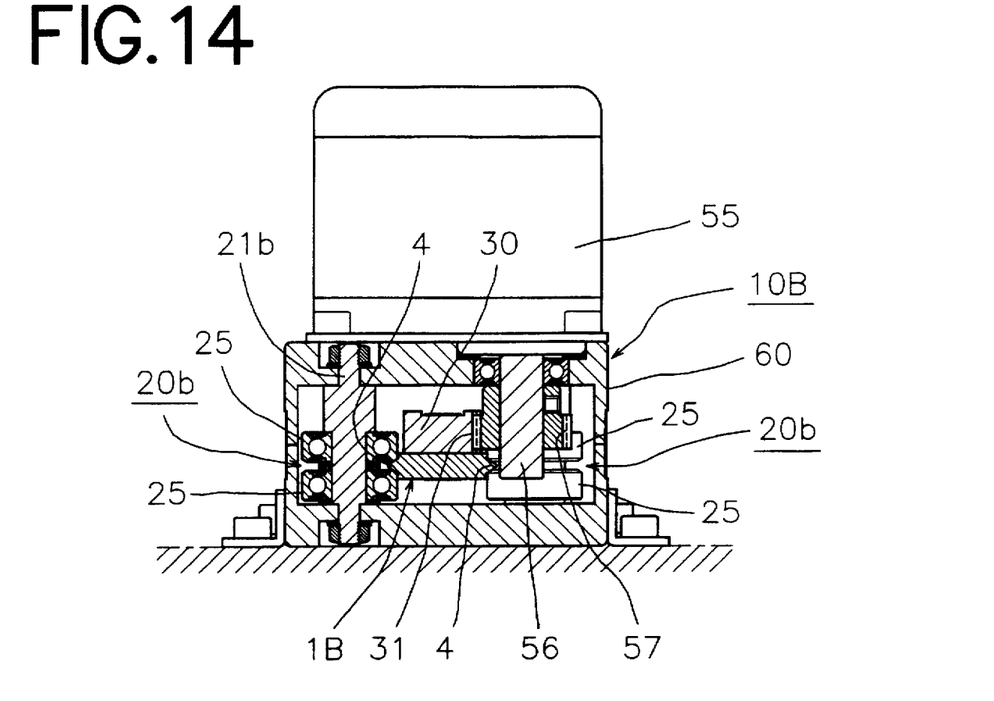
FIG. 14 is a vertical elevation in part of another embodiment.

The embodiment in FIG. 14 is also fundamentally similar to the one shown in FIG. 12, but a combination of a guide rail 1B and a base member 30 with a gear rack 31 are not fixed to a supporting structure, while a plurality of carriers 10B have frames 60 fixed to the supporting structure, thus permitting the combination of guide rail 1B and base member 30 to move through the plurality of the stationary carriers 10B.

Each carrier 10B is provided with roller assemblies 20b which include journals with stems 21b at both ends thereof. The roller assemblies 20b are supported rigidly in each frame 60 by means of the stems 21b. This embodiment will be suitable to transfer substantially long articles just like a guide rail 1B.

Figure 15:
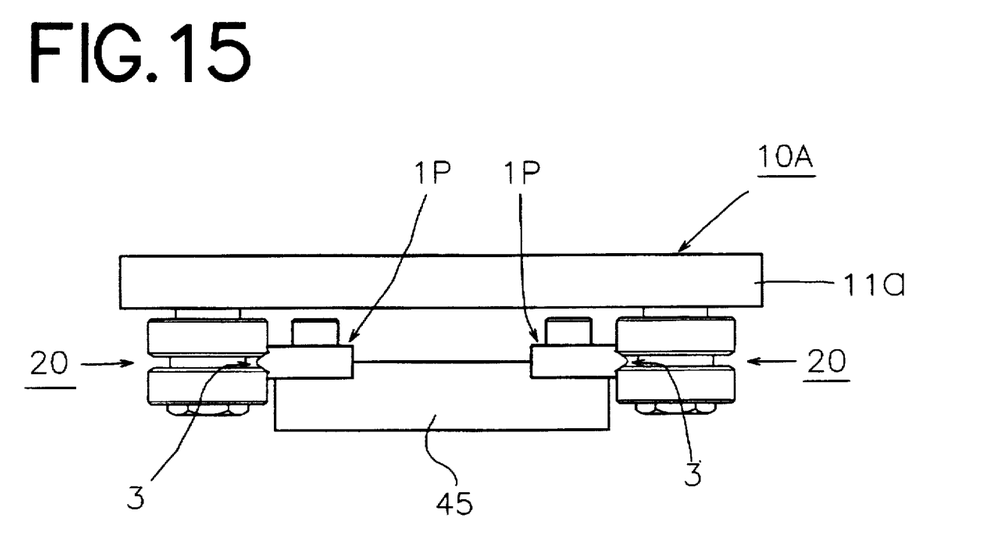
FIG. 15 is a side end view of another embodiment.

The embodiment in FIG. 15 is also fundamentally similar to the one shown in FIGS. 8 and 9, but each carrier 10A has a substantially wide frame 11a, and runs along a pair of parallel guide rails 1P with substantially wide base members 45 intermediate both rails 1P.

Each guide rail 1P is provided with only one guide side 3, and both guide rails 1P are so arranged that their V edges 4 are in an oppositely directed parallel relation with each other. This embodiment is suitable to transfer substantially wide articles.

Figure 16:
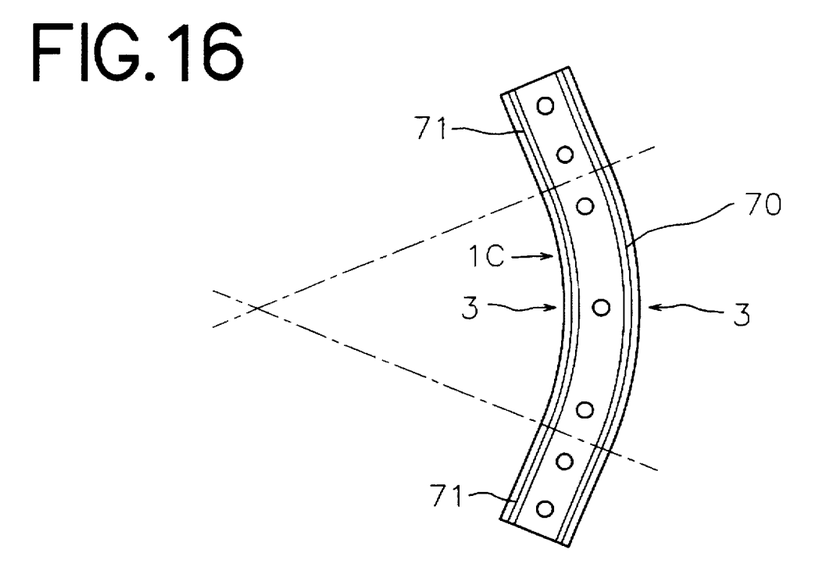
FIG. 16 is a plan view of a curving rail segment embodying the invention.

The curving rail segment in FIG. 16 is designated as 1C, and fundamentally similar to those shown in FIGS. 8 and 9, but comprises a sectorial middle part 70 and straight extensions 71 formed integrally on both ends thereof. The curving segment 1C can be machine-made easily.

The straight extensions 71 of curving rail segment 1C can be connected with other straight segments or similar straight extensions of other curving segments, and this will make it possible to avoid any straight-to-curving rail joint but provide straight-to-straight joints only all along the guide rail, though it comprises both straight and curving segments, and however long it may be.

The straight-to-straight rail joints can be made much more accurately than straight-to-curving joints. And the guide rail with no straight-to-curving joint will make it possible to avoid that the carriers often catch straight-to-curving joints so as to cause rattling, irregular running and early failure. Instead, the carriers will run along a guide rail with both straight and curving segments as smoothly as one with straight segments only.

Figure 17:
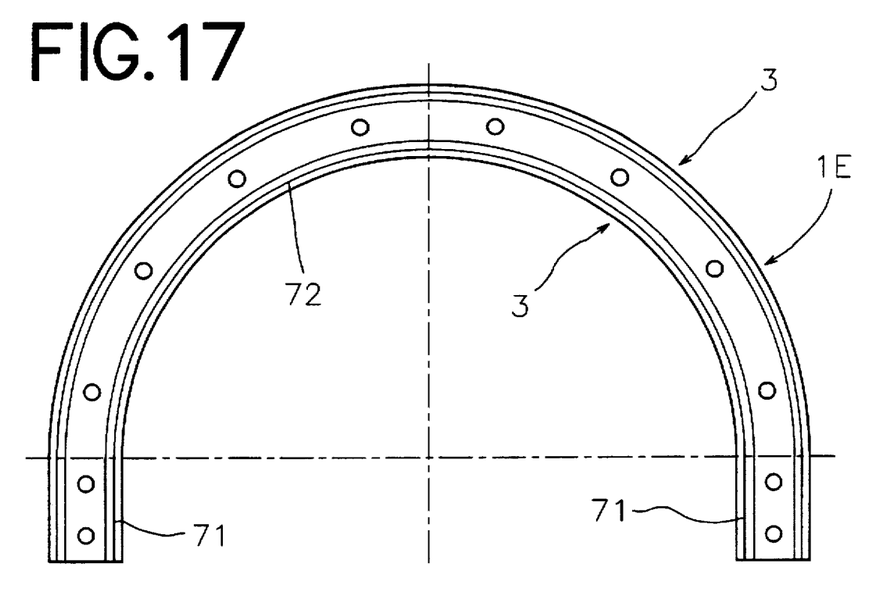
FIG. 17 is a plan view of another curving rail segment embodying the invention.

The curving rail segment in FIG. 17 is designated as 1E, and similar to the one shown in FIG. 16, but comprises a semicircular middle part 72 and straight extensions 71 formed integrally on both ends thereof.

The curving segment 1E can also be machine-made esaily. Since the semicircular part 72 are provided with straight extensions 71 at both ends, the both ends will not unduly open by themselves after manufactured. And this will facilitate not only checking the gauge of semicircular part 72 following manufacture but also connecting with other rail segments accurately.

Various other curving rail segments with straight extensions can be machine-made, and thus it will be made possible to provide a considerable long streamline guide rail comprising both straight and curving segments with straight-to-straight joints only.

Again referring to FIGS. 1 through 9 as well as FIGS. 16 and 17, the top areas 4b of V edges remain free of any engagement or contact within the space left between the bearing outer races in each pair, and thus it will be avoided without fail that the V edges 4 are wedged unduly between the bearing outer races in each pair to cause so much friction as to prevent the ball bearings 25 from rolling normally and force them to slide on the rail, though the carriers 10 are pushed unduly against one side of the guide rail due to centrifugal force when they run along the curving segments 1C and 1E; in addition, centrigual force will also be borne by the plain lanes 5. Therefore the ball bearings 25 will run in an assuredly rolling relation to the curving guide rail. This will decrease friction drastically and permit the carriers to run lightly and noiselessly along a streamline guide rail.

Figure 18:
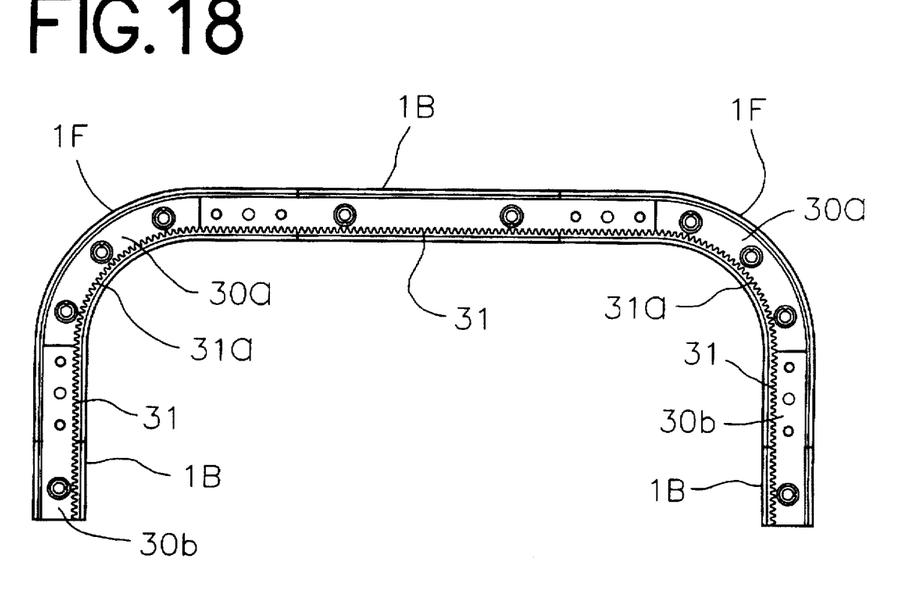
FIG. 18 is a bottom plan view of straight and curving rail segments together with base members embodying the invention.
Figure 19:
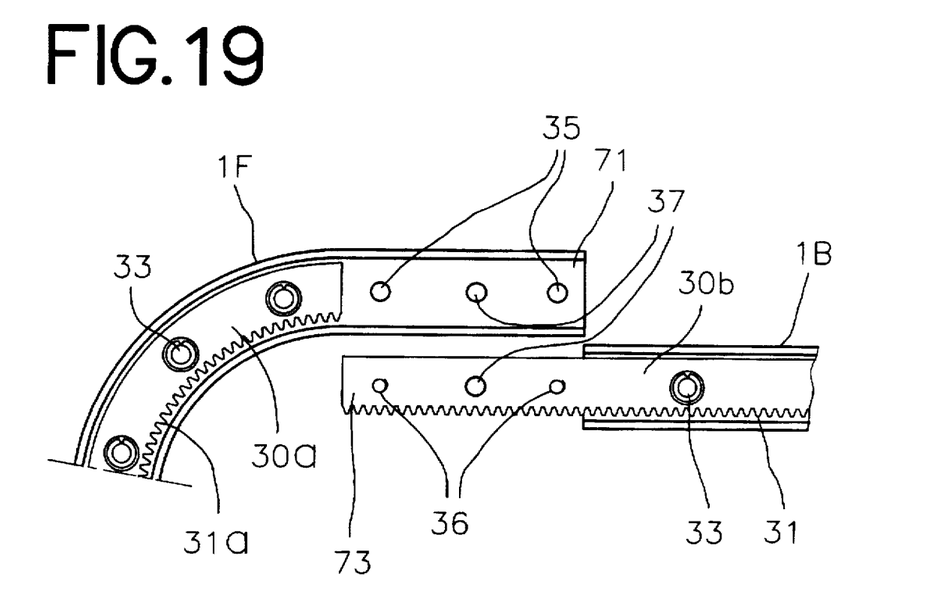
FIG. 19 is an enlarged view showing the connection of a straight and a curving rail segment in FIG. 18.

The straight and curving rail segments in FIGS. 18 and 19 are fundamentally similar to those shown in FIGS. 10, 11, 16 and 17, and they are connected with each other to form a part of a streamline guide rail.

Each straight segment 1B is joined together with a base member 30b having a gear rack 31 at one side, and each curving segment 1F is joined together with a base member 30a having a gear 31a at one side. The curving segment 1F is provided with straight extensions 71 on both ends thereof. The base member 30b is longer than its mated rail segment 1B so as to have straight extensions 73 on both ends thereof. The base member 30a is shorter than its mated rail segment 1F so as to leave the straight extensions 71 uncovered with the base member 30a. The rail segment extension 71 is as long as the base member extension 73, as best shown in FIG. 19.

Each straight extension 71 is provided with holes 35 and a knock pin hole 37, and each straight extension 73 is provided with threaded holes 36 and a knock pin hole 37, correspondingly. Both straight extensions 71 and 73 are joined together firmly with set screws (not shown) through the corresponding holes 35 and 36. Thus the straight and curving segments 1B and 1F are connected with each other in a way that the joints of guide rails 1B and 1F are displaced from the joints of base members 30b and 31a so as to overlap the rail joints with the base members 30b.

Figure 20:
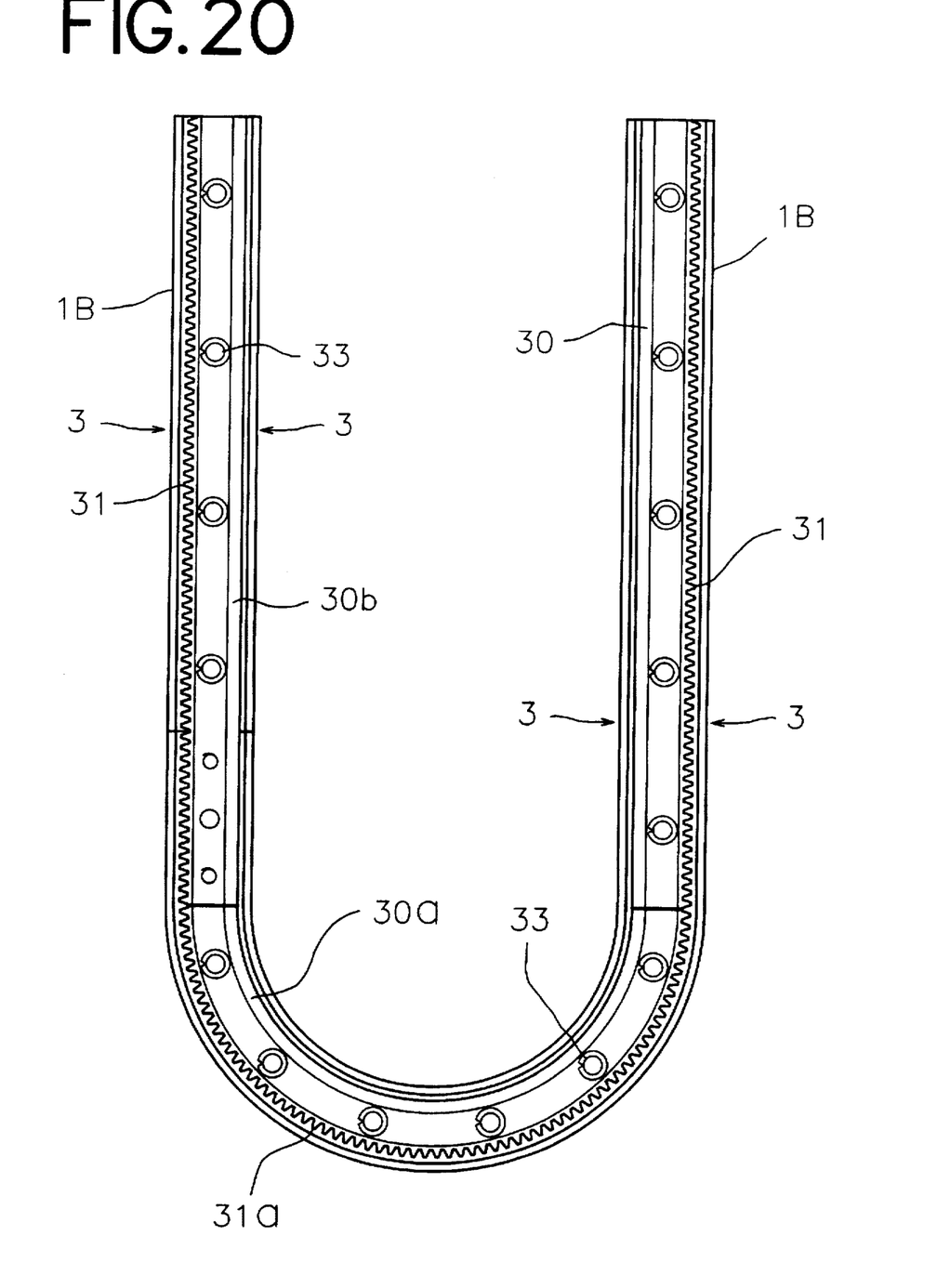
FIG. 20 shows a modification of the embodiment in FIG. 18.

The overlapping connections will help make up the rail joints more accurately, firmly and easily in providing a streamline guide rail. Various other streamline guide rails can be made similarly. The modification in FIG. 20 is an example to show the great versatility. Thus it will be possible that a plurality of carriers run along a streamline guide rail automatically and continuously without any stopping to change-over the running direction during operation.

It will be understood that further modifications may be made in constructions of the above-given embodiments, and that the invention is in no way limited to the above-given embodiments.

What I claim is:

1. A track system comprising:
    a guide rail having a pair of opposed parallel guide sides and a pair of opposed parallel set sides, each of said guide sides provided with a pair of parallel plain lanes and a parallel V edge protruded between said pair of parallel plain lanes, said V edge having a top portion and a base portion;

at least one carrier adapted to be run along said guide rail and comprising a frame and a plurality of roller assemblies rigidly secured to said frame for supporting said at least one carrier by engaging with said opposed parallel guide sides, each of said roller assemblies comprising a journal and a pair of ball bearings mounted on said journal with a space between said pair of ball bearings; and each of said pair of ball bearings including an outer race which engages with each of said pair of parallel plane lanes and which has a beveled corner facing to said V edge, each of said pair of ball bearings adapted to cooperate with said V edge such that said beveled corner engages with said base portion of said V edge and such that said top portion of said V edge remains in said space between said pair of ball bearings without engaging said outer race.

2. A track system as claimed in claim 1, wherein each of said guide sides is provided with narrow grooves at boundaries between said V edge and said plain lanes so as to define the boundaries between said V edge and said plain lanes sharply and so as to keep lubricating oil in the grooves along said guide rail.

3. A track system as claimed in claim 2, wherein said journal includes a threaded stem on one end of said journal, a head on another end of said journal, and a shoulder between said stem and said head, said frame is provided with a plurality of holes into each of which said stem is introduced, and said pair of ball bearings are clamped to said journal between said head and said shoulder.

4. A track system as claimed in claim 3, wherein each stem arranged on one side of said guide sides is eccentrically formed on said journal.

5. A track system as claimed in claim 4, wherein said frame is provided with a plurality of slits and bolt holes extending perpendicular to said slits, and each of said slits is formed in connection with each of said holes into each of which said stem eccentrically formed on said journal is introduced.

6. A track system as claimed in claim 5, wherein said guide rail is fixed to a supporting structure with bolts which passes through said set sides.

7. A track system as claimed in claim 6, further comprising:
at least one base member interposed between said guide rail and the supporting structure; and
hollow rivets which join said guide rail and said base member together, said bolts being provided so as to pass through said hollow rivets.

8. A track system as claimed in claim 7, wherein said base member is provided with a gear rack at one side of said base member along one of said guide sides.

9. A track system as claimed in claim 8, further comprising:
a motor mounted on said frame and having a shaft; and
a pinion connected to the shaft and adapted to engage with said gear rack.

10. A track system as claimed in claim 9, wherein said pinion is adapted to serve as one of the pair of ball bearings.

11. A track system as claimed in claim 6, wherein said guide rail comprises a plurality of straight and curved rail segments connected with each other, each of said curved rail segments comprising a curving middle part and straight extensions which are formed at both ends of said curving middle part and adapted to be connected to said straight rail segments, further comprising:
base members interposed between said rail segments and the supporting structure; and
hollow rivets joining said rail segments and said base member together, said bolts being provided so as to pass through each of said hollow rivets.

12. A track system as claimed in claim 11, wherein said rail segments have first connecting joints at end portions of said rail segments, said base members have second connecting joints at end portions of said base members, and said base members are connected with each other by overlapping said first and second connecting joints.

* * * * *